United States Patent
Maeda

(10) Patent No.: US 7,583,334 B2
(45) Date of Patent: Sep. 1, 2009

(54) LIQUID CRYSTAL DEVICE AND ELECTRONIC APPARATUS

(75) Inventor: Tsuyoshi Maeda, Kai (JP)

(73) Assignee: Seiko Epson Corporation, Tokyo (JP)

( * ) Notice: Subject to any disclaimer, the term of this patent is extended or adjusted under 35 U.S.C. 154(b) by 157 days.

(21) Appl. No.: 11/941,256

(22) Filed: Nov. 16, 2007

(65) Prior Publication Data
US 2008/0117365 A1    May 22, 2008

(30) Foreign Application Priority Data
Nov. 22, 2006    (JP) .............................. 2006-315186

(51) Int. Cl.
*G02F 1/1335* (2006.01)
(52) U.S. Cl. .......................................... 349/96; 349/99
(58) Field of Classification Search .................. 349/96, 349/99, 117, 123
See application file for complete search history.

(56) References Cited

U.S. PATENT DOCUMENTS

2001/0038431 A1*  11/2001  Fujimaki et al. ............ 349/123
2005/0179835 A1*   8/2005  Lee et al. ....................... 349/99
2005/0264720 A1*  12/2005  Itou et al. ....................... 349/99

FOREIGN PATENT DOCUMENTS

JP          03-119889          5/1991

* cited by examiner

*Primary Examiner*—David Nelms
*Assistant Examiner*—David Y Chung
(74) *Attorney, Agent, or Firm*—Workman Nydegger

(57) ABSTRACT

The invention relates to a liquid crystal device capable of simultaneously displaying at least two images in different directions comprising a first substrate with a translucent property, a second substrate opposed to the first substrate with a translucent property, a liquid crystal layer interposed between the first and second substrate with a twist angle of approximately ninety degrees, a first polarizing plate disposed opposite the liquid crystal layer with the first substrate being interposed therebetween, and a second polarizing plate disposed opposite the liquid crystal layer with the second substrate being interposed therebetween, wherein the absorption axis of the first polarizing plate and the second polarizing plate are shifted from an orientation direction of the liquid crystal layer by at least one degree and not more than three degrees.

9 Claims, 12 Drawing Sheets

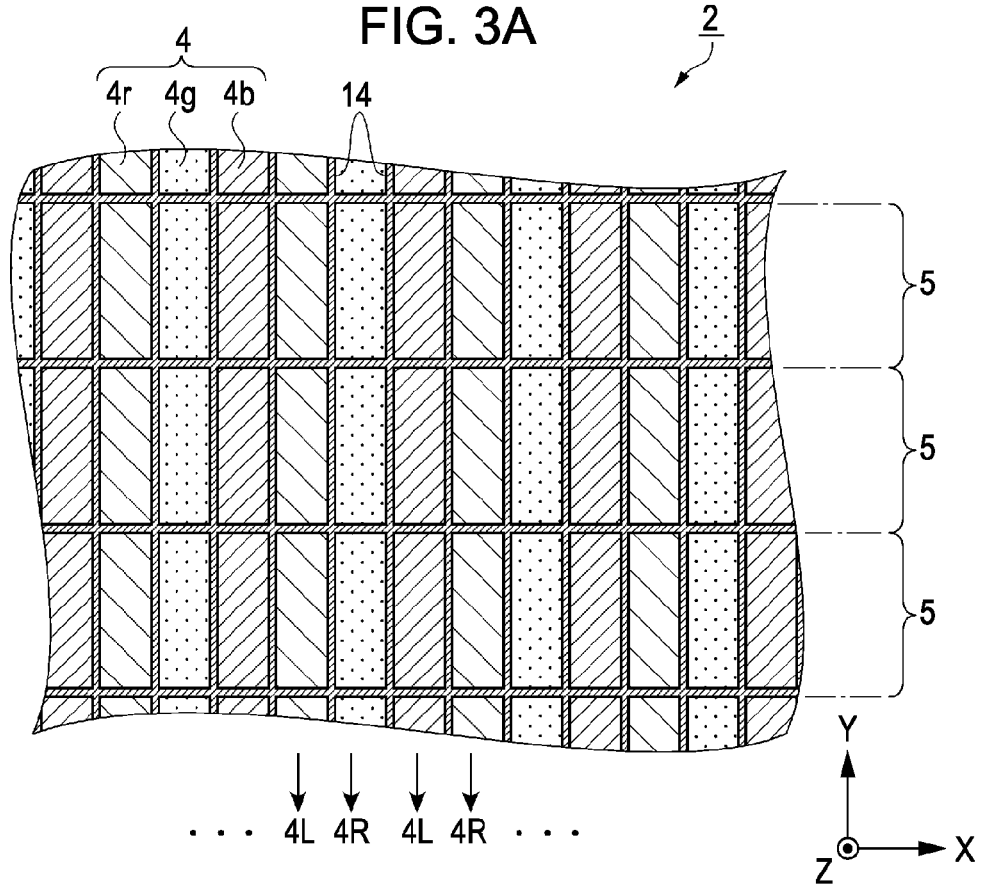
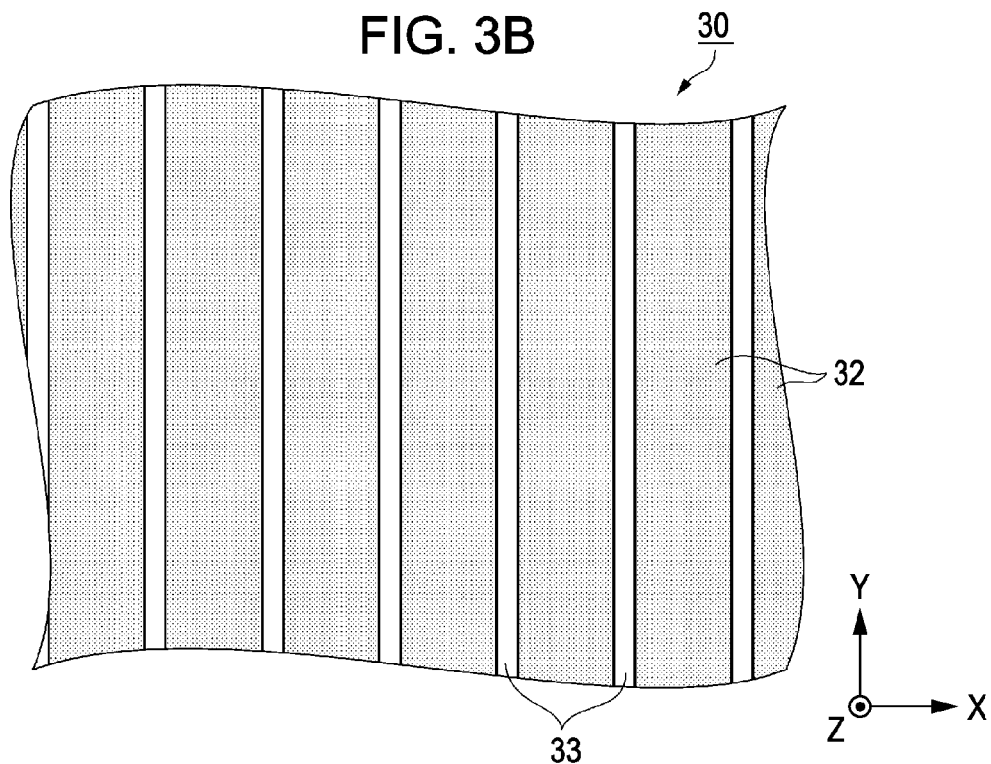

LIQUID CRYSTAL DEVICE AND ELECTRONIC APPARATUS

BACKGROUND

The entire disclosure of Japanese Patent Application No. 2006-315186, filed Nov. 22, 2006 is expressly incorporated herein by reference.

1. Technical Field

The present invention relates to a liquid crystal device. More specifically, the present invention relates to a liquid crystal device and electronic apparatus capable of displaying at least two images in different directions at the same time.

2. Related Art

In a known configuration, a liquid crystal device is provided with a pair of substrates with a liquid crystal layer between the pair of substrates. In some configurations, the liquid crystal device has a barrier mask substrate that is provided on the surface of one of the substrates described above. The barrier mask substrate has a barrier layer wherein openings are formed. Using this configuration, the liquid crystal device of the related art is capable of simultaneously displaying two images in different directions. Japanese Patent No. 2,857,429 discloses a three-dimensional (3D) image display device which is capable of offering a stereoscopic display of two images in the above-described manner.

It is further known in the art in an exemplary application that two observers can receive differing views of the two images, meaning that one person can view one image obliquely from the left side while the other person can view the other image obliquely from the right side. This is achieved by making the display directions of the above-mentioned two images substantially different from each other. In a liquid crystal device capable of performing the "dual-screen" (i.e., in a virtual sense) display described above, the observers view the display not from the normal direction of the substrate (i.e., from the front direction) but mainly from an oblique angle.

Since a typical liquid crystal devices are configured so as to offer the maximum display contrast when viewed from the front, it is difficult to ensure a satisfactory contrast when the display is viewed at an oblique angle in the "dual-screen" system described above. Thus, when a liquid crystal device is used in a dual-screen display without adopting any effective technical solution, the display contrast of the two images at their optimum display angle will be poor, which deteriorates the visibility of the individual images.

BRIEF SUMMARY OF THE INVENTION

An advantage of some aspects of the invention is to a liquid crystal device and an electronic apparatus capable of enhancing the display contrast in a series of individual images that may be simultaneously displayed in different directions. The contrast of the images is improved at their optimum angle of view for display so as to improve the visibility of the individual images.

In order to address at least the above-identified problems, one aspect of the invention provides, a liquid crystal device capable of simultaneously displaying at least two images in different directions. The liquid crystal device comprises a first substrate that has a translucent property, a second substrate that is opposed to the first substrate, the second substrate having a translucent property, a liquid crystal layer that is interposed between the first substrate and the second substrate, the liquid crystal layer having a twist angle of approximately ninety degrees; a first polarizing plate disposed opposite the liquid crystal layer with the first substrate being interposed therebetween; and a second polarizing plate disposed opposite the liquid crystal layer with the second substrate being interposed therebetween, wherein the absorption axis of the first polarizing plate is shifted from an orientation direction of the liquid crystal layer angle that is not less than one degree and not more than three degrees, and wherein the absorption axis of the second polarizing plate is shifted from the orientation direction of the liquid crystal layer by an angle that is not less than one degree and not more than three degrees.

A second aspect of the invention relates to an electronic apparatus that has the liquid crystal device of the configuration described above in a display section. Using the previously described configuration, it is possible to provide an electronic apparatus capable of simultaneously displaying at least two images in different directions, while offering high-quality display with high contrast at the viewing angle that is most suitable for viewing the individual images.

BRIEF DESCRIPTION OF THE DRAWINGS

The invention will be described with reference to the accompanying drawings, wherein like numbers reference like elements.

FIG. 3A is an enlarged plain view of a liquid crystal panel;

FIG. 3B is an enlarged plain view of a barrier mask substrate;

DESCRIPTION OF EXEMPLARY EMBODIMENTS

With reference to accompanying drawings, exemplary embodiments of the invention are described below. It should be noted that, in the accompanying drawings that are mentioned below, the dimensions and/or scales of constituent elements are modified from those that will be adopted in an actual implementation of the invention for the purpose of making them easily recognizable in each illustration.

First Embodiment

Configuration of Liquid Crystal Device

Figure 1:
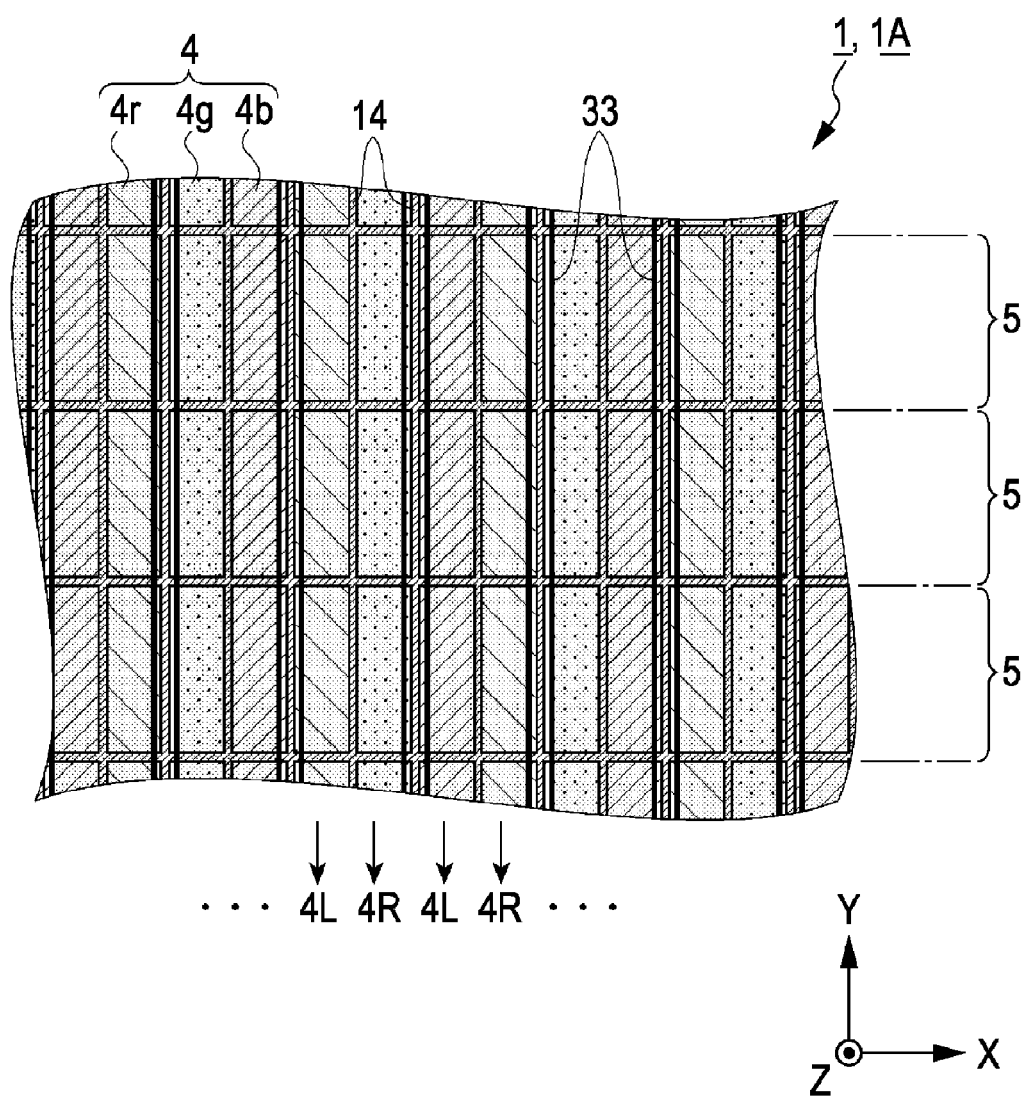
FIG. 1 is an enlarged plain view of a liquid crystal device according to a first exemplary embodiment of the invention.
Figure 2:
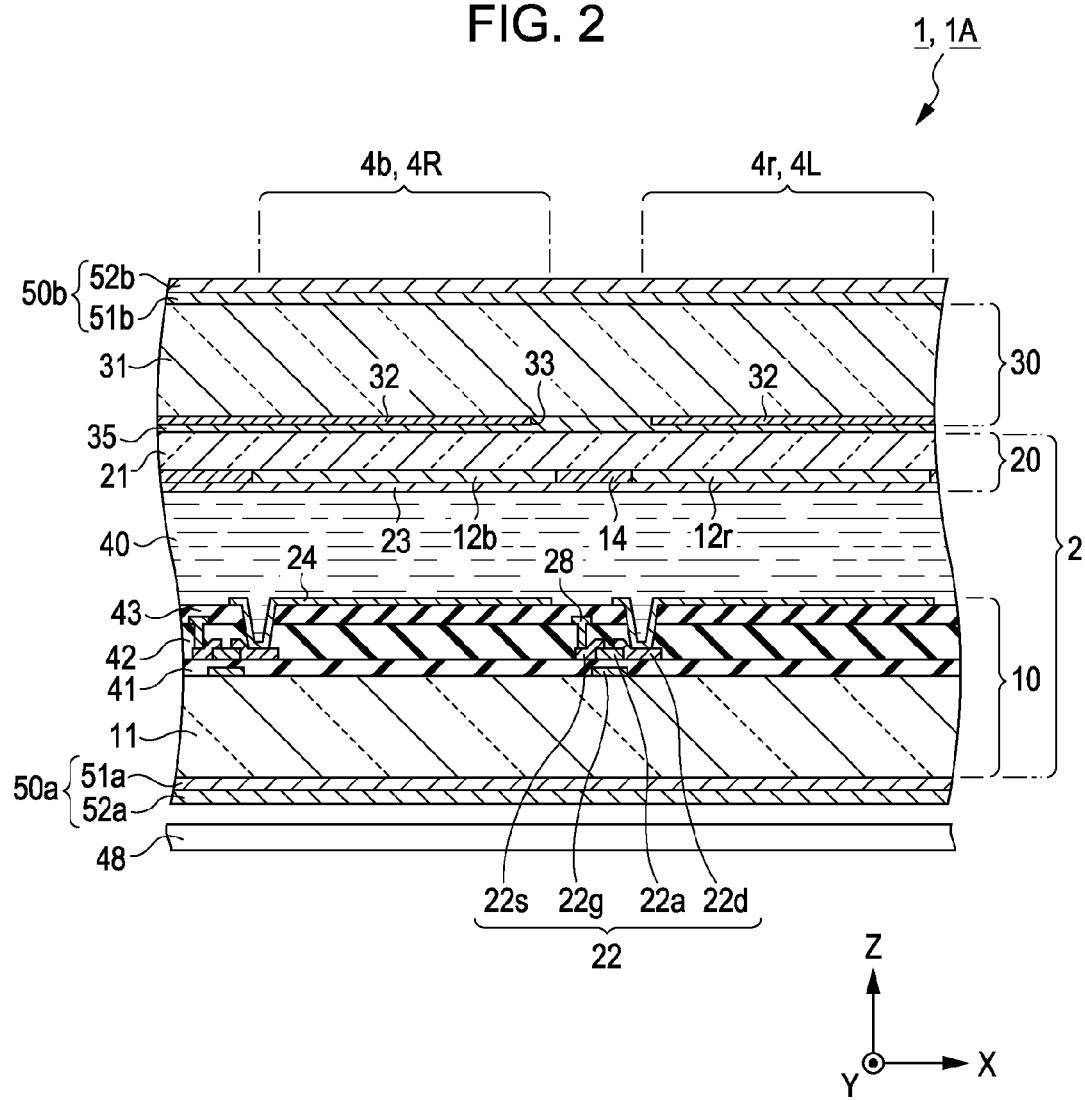
FIG. 2 is a sectional view illustrating an exemplary configuration of the liquid crystal device shown in FIG. 1.

FIG. 1 is an enlarged plain view of a liquid crystal device 1 according to a first exemplary embodiment of the present invention. FIG. 2 is a sectional view that schematically illustrates an exemplary configuration of the liquid crystal device 1 shown in FIG. 1. As illustrated in FIG. 2, the liquid crystal device 1 is provided with a liquid crystal panel 2, which functions as a display panel, and is further provided with a barrier mask substrate 30 that is adhered to the liquid crystal panel 2 via an adhesive 35.

The liquid crystal panel 2 has an element substrate 10 and a counter substrate (i.e., opposite substrate) that are adhered to each other via a frame-patterned sealant, which is not shown in the drawing. The distance between the element substrate 10 and the counter substrate 20 is determined by columnar spacers, which are not shown in the drawing. The element substrate 10 includes a glass substrate 11 which constitutes a first substrate according to the invention, while the counter substrate 20 includes a glass substrate 21 that constitutes a second substrate according to the invention. A TN-mode liquid crystal layer 40 is disposed between the element substrate 10 and the counter substrate 20. The barrier mask substrate 30 includes a glass substrate 31 as its base substance. A barrier layer 32 having a light-shielding property is deposited on the liquid-crystal-panel-side (2) surface of the glass substrate 31. Opening portions 33 are formed in the barrier layer 32.

FIG. 3A is an enlarged plain view of the liquid crystal panel 2 before being adhered to the barrier mask substrate 30. FIG. 3B is an enlarged plain view of the barrier mask substrate 30 before being adhered to the liquid crystal panel 2. The liquid crystal device 1 illustrated in FIG. 1 is made up of the liquid crystal panel 2 and the barrier mask substrate 30 adhered to each other. The shaded region with dots in FIG. 1 denotes an area formed in the barrier mask substrate 30 that is covered by the barrier layer 32.

As illustrated in FIG. 3A, the liquid crystal panel 2 has rectangular pixels 4r, 4g, and 4b (hereafter correctively referred to as "pixel 4") that are arrayed in a matrix pattern. The pixels 4r perform display red, while the pixels 4g display green, and the pixels 4b display blue. It should be noted that the pixels 4r, the pixels 4g, and the pixels 4b are arranged in a repetitive pattern in the order of appearance herein when viewed along the X direction in the drawing. On the other hand, when viewed along the Y direction, the pixels 4 form a pattern of similarly colored stripes. That is, each of the groups of the pixels 4r, 4g, and 4b are arranged in such a manner that each color component forms vertical lines in the Y direction which may be recognized as a vertical stripe pattern. A light-shielding layer 14 that is made of a black resin is formed between each adjacent pair of pixels 4. In the following description, each row of the pixels 4 aligned in the X direction is referred to as a pixel row 5.

Each one of the pixels 4 contributes to the display of either the first image or the second image. In this specification, the pixels 4 that function to display the first image may be referred to as pixels 4L, whereas the pixels 4 that function to display the second image may be referred to as pixels 4R. In the present embodiment of the invention, the pixels 4L and the pixels 4R are arranged in an alternating order when viewed along the X direction. On the other hand, when viewed along the Y direction, each of the pixels 4L and the pixels 4R are aligned such that the entire arrangement constitutes a vertical stripe pattern of the pixels 4L and the pixels 4R.

The barrier layer 32 formed in the barrier mask substrate 30 has, as illustrated in FIG. 3B, opening portions 33 at regions that substantially overlap the light-shielding layers 14 between the pixels 4L and the pixels 4R when viewed from a direction which is normal to the liquid crystal panel 2. Herein, it should be particularly noted that the phrase "between the pixels 4L and the pixels 4R" has a special connotation which exclusively refers to regions between each pair of pixels 4L and 4R, and does not contain the regions between the pixels in the pair of pixels 4L and 4R. Therefore, the opening portions 33 are provided for every other line of the light-shielding layer 14 when viewed in the X direction. The width of the opening portion 33 is configured to be slightly greater than that of the light-shielding layer 14.

Next, with reference to FIG. 2, the configuration of the liquid crystal device 1 having the liquid crystal panel 2 illustrated in FIG. 3A and the barrier mask substrate 30 illustrated in FIG. 3B adhered to each other (that is, the configuration illustrated in FIG. 1) will be described.

The element substrate 10 of the liquid crystal device 1 is a so-called TFT array substrate that includes TFT (Thin Film Transistor) elements 22. Each of the TFT elements 22 correspond to one of the pixels 4. The element substrate 10 further includes gate lines (not shown in the drawing), data lines 28, and pixel electrodes 24, though the element substrate 10 is not limited thereto. Each of the gate lines are connected to a corresponding TFT element 22. The same holds true for the data lines 28 and pixel electrodes 24. First, second, third, and fourth component layers are laminated on the surface of the glass substrate 11 of the element substrate 10 that is closest to the liquid crystal layer 40. In order to prevent the occurrence of a short-circuit malfunction between adjacent component layers, an interlayer insulation film 41, an interlayer insulation film 42, and an interlayer insulation film 43 are disposed between the first component layer and the second component layer, between the second component layer and the third component layer, and between the third component layer and the fourth component layer, respectively. It should be noted that TFD (Thin Film Diode) elements having two terminals each or the like may be used as a substitute for the TFT elements 22 with three terminals. These elements function as switching devices.

A gate electrode 22g, which constitutes a part of each of the TFT element 22s, is formed on the first component layer that is deposited on the surface of the glass substrate 11.

The second component layer is deposited over the first component layer with the interlayer insulation film 41 disposed between the first component layer and second component layer. The interlayer insulation film 41 is made of $SiO_2$, SiN, or the like. A semiconductor layer 22a made of amorphous silicon, and is formed on the second component layer at a position that overlaps each of the gate electrodes 22g. A source electrode 22s is formed at the source region of the semiconductor layer 22a in such a manner that the source electrode 22s partially overlaps the semiconductor layer 22a. On the other hand, a drain electrode 22d is formed at the drain region of the semiconductor layer 22a in such a manner that the drain electrode 22d partially overlaps the semiconductor layer 22a. Each of the TFT elements 22 are made up of the semiconductor layer 22a, the source electrode 22s, the drain electrode 22d, and the gate electrode 22g.

The third component layer is deposited over the second component layer with the interlayer insulation film 42 being disposed between the third component layer and the second component layer. The interlayer insulation film 42 is made of $SiO_2$, SiN, or the like. The data lines 28 are formed on the third component layer. Each of the data lines 28 are connected to the corresponding source electrode 22s of the TFT element 22 via a contact hole that is formed in (or penetrates through) the interlayer insulation film 42.

The fourth component layer is deposited over the third component layer with the interlayer insulation film 43 being disposed between the fourth component layer and the third component layer. The interlayer insulation film 43 is made of SiN or the like. The pixel electrodes 24 are each made of translucent ITO (indium Tin Oxide) and are formed on the fourth component layer. Each of the pixel electrodes 24 are connected to the corresponding drain electrode 22d of the TFT element 22 via a contact hole that penetrates through the interlayer insulation films 42 and 43. An alignment film (i.e., orientation film) made of polyimide, which is not shown in the drawing, is formed on the surface of the fourth component layer.

A viewing angle compensation film 51a and a polarizing plate (film) 52a are laminated on the further surface of the glass substrate 11 that is opposite to the closest surface to the liquid crystal layer 40 previously mentioned. Thus, the viewing angle compensation film 51a and the polarizing plate 52a are deposited in the following manner: the viewing angle compensation film 51a is deposited on the further surface of the glass substrate 11, and the polarizing plate 52a is deposited on the viewing angle compensation film 51a. In this configuration, the viewing angle compensation film 51a corresponds to a first film. Similarly, the polarizing plate 52a corresponds to a first polarizing plate. In the following description, a combination film made up of the viewing angle compensation film 51a and the polarizing plate 52a deposited on the glass substrate 11 is collectively referred to as an optical film 50a. A backlight 48, which irradiates light toward the liquid crystal device 1, is provided at a position that faces to (i.e., is opposed to) the optical film 50a.

Figure 4:
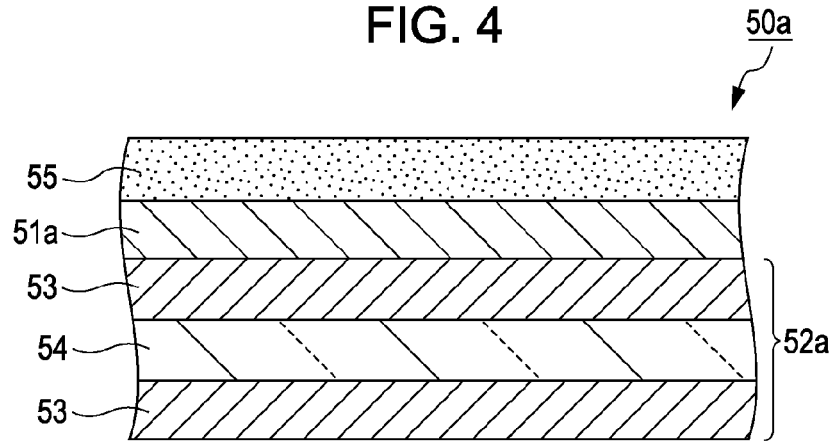
FIG. 4 is a detailed sectional view illustrating an example of the configuration with an optical film.

FIG. 4 is a sectional view that schematically illustrates an example of the configuration of the optical film 50a. The optical film 50a has a laminated structure that includes an adhesive layer 55, the viewing angle compensation film 51a, and the polarizing plate 52a, which are deposited in that respective order. The polarizing plate 52a is made up of a pair of TAC (cellulose triacetate/triacetyl cellulose) films 53 and a polarizer 54 containing iodine. Within the polarizing plate 52a, the iodine-containing polarizer 54 is disposed between the pair of TAC films 53. The optical film 50a is bonded to the glass substrate 11 using an adhesive layer 55.

Figure 5:
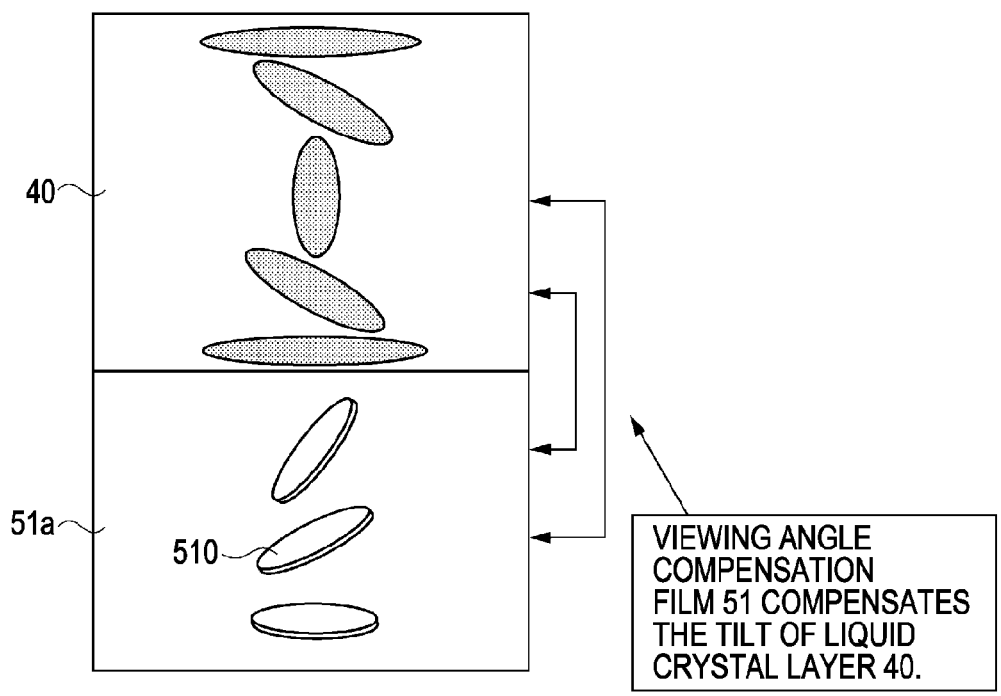
FIG. 5 is a schematic sectional view of a liquid crystal layer and a viewing angle compensation film.

FIG. 5 is a schematic sectional view of the liquid crystal layer 40 and the viewing angle compensation film 51a explaining the function of the viewing angle compensation film 51a. The viewing angle compensation film 51a contains a flat discotic-type polymer liquid crystal 510 that indicates an optically negative single axiality. The viewing angle compensation film 51a is formed as a solidified film of the nematic hybrid orientation/alignment property/structure of the flat discotic-type polymer liquid crystal 510. The angle formed by the direction of the normal of a flat disc, formed by the discotic-type polymer liquid crystal 510, and the film plane at the upper face of the film is not the same as the angle formed at the lower face thereof, indicating a hybrid orientation. The above-mentioned angles change progressively (i.e., continually) between the upper face of the film and the lower face. The direction obtained by projecting the normal direction of the flat disc plane onto the film surface is referred to as the orientation axis of the viewing angle compensation film 51a.

The viewing angle compensation film 51 is capable of compensating the tilt of the liquid crystal layer 40 using the discotic-type polymer liquid crystal 510. Since the tilt direction of the discotic-type polymer liquid crystal 510 (a molecule having a negative single axiality) contained in the viewing angle compensation film 51a gradually changes, there is a combination that cancel the refractive index anisotropy between the molecule with a negative single axiality and a liquid crystal molecule (a molecule having a positive single axiality) contained in the liquid crystal layer 40. By focusing on this combination, an index of refraction may be equalized regardless of the difference in viewing directions. As a result, it is possible to enhance the viewing angle characteristics of the liquid crystal device 1. In addition, it is further possible to increase contrast that is obtained/perceived when an observer monitors the display of the liquid crystal device 1 at an oblique angle, improving the visibility of images.

Now, referring back to FIG. 2, the configuration of the liquid crystal device 1 will be further described. A plurality of color filters having red, green, and blue colors are formed on one surface of the glass substrate 21 of the counter substrate 20 that is closest to the liquid crystal layer 40. The red color filters 12r, green color filters 12g (not shown in the drawing), and blue color filters 12b correspond to the pixels 4r, 4g, and 4b, respectively. In the following description, these color filters may be collectively referred to as color filters 12. Each of the color filters 12 functions as a layer that absorbs light at a specified wavelength out of an incident light. Thanks to the color filter 12, transmitted light has any one desired color component (for example, red light, green light, or blue light). The light-shielding layer 14 that is made of a black resin is formed between each adjacent two of the pixels 4. A common electrode 23, which is made of translucent ITO, is formed on the surface of the color filters 12 and the light-shielding layer 14. The common electrode 23 is connected to a constant potential line that is not shown in the drawing, such that the common electrode 23 is maintained at a constant potential level. An alignment film, that is, an orientation film, which is made of polyimide, is formed on the surface of the common electrode 23. This orientation film is not shown in the drawing. As an example of alternative configurations, an overcoat film made of a translucent resin may be laminated on the color filters 12 and the light-shielding layer 14. If such an alternative configuration is adopted, the common electrode 23 may be formed on the overcoat film.

As has already been described, the liquid crystal layer 40 is disposed between the element substrate 10 and the counter substrate 20. The liquid crystal layer is configured to operate in a TN mode. The twist angle of the liquid crystal layer 40 is set at 90 degrees (90°). When a driving voltage is applied between the common electrode 23 and the pixel electrodes 24, an electric field is generated in the liquid crystal layer 40. The orientation state of the liquid crystal molecules contained in the liquid crystal layer 40 changes as the electric field occurs. The liquid crystal device 1 performs a display operation by utilizing a polarization conversion function that occurs in accordance with the orientation state of the liquid crystal molecules as well as the polarization selection function that is occurs via the polarizing plates 52a and 52b.

The barrier mask substrate 30 is adhered using an adhesive 35 to the other surface of the glass substrate 21 that is furthest from the liquid crystal layer 40. The barrier mask substrate 30 includes the glass substrate 31 as its base substance. The barrier layer 32 is deposited on the liquid-crystal-layer-side (40) surface of the glass substrate 31.

The glass substrate 21 is treated by means of chemical etching processing, CMP (Chemical Mechanical Polishing) or the like so as to have a thickness of approximately 50 μm. Through such chemical processing, it is possible to adjust the distance between the color filters 12, which emit light, and the opening portions 33 of the barrier layer 32. As a result of the adjustment of this distance, it is possible to adjust an angle of the optical path from each of the color filters 12 to the corresponding opening portion 33. Using this method, the liquid crystal device 1 is able to display both the first image and the second image at a preferred angle.

A viewing angle compensation film 51b and the polarizing plate 52b are laminated on the outer surface of the glass substrate 31, that is furthest from the glass substrate 21. Note that the viewing angle compensation film 51b and the polarizing plate 52b are formed in that order, respectively. In one configuration, the viewing angle compensation film 51b corresponds to a second film, while the polarizing plate 52b corresponds to a second polarizing plate. In the following description, a combination film made up of the viewing angle compensation film 51b and the polarizing plate 52b deposited on the glass substrate 31 is collectively referred to as an optical film 50b. The configuration of the optical film 50b is the same as that of the optical film 50a, and is shown in detail in FIG. 4.

Dual Screen Display Offered by Liquid Crystal Device

Figure 6:
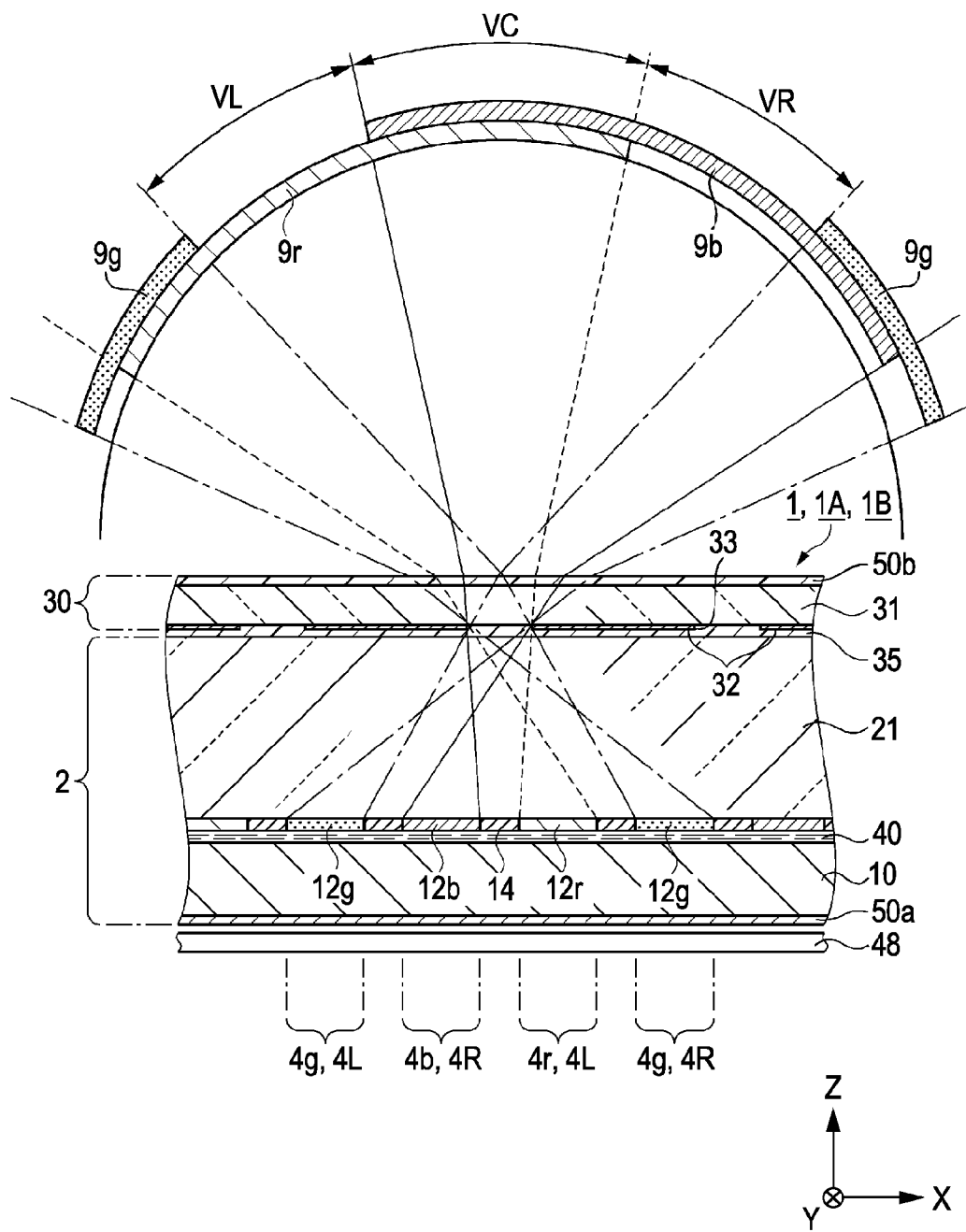
FIG. 6 is sectional view of the liquid crystal device illustrated in FIG. 1 which explains the relationship between viewing angles and the corresponding observed images.

FIG. 6 is a diagram that illustrates a sectional view of the liquid crystal device 1 having the above-described configuration which explains the relationship between viewing angles and the corresponding observed images. It should be noted that FIG. 6 highlights a plurality of beams of light that pass through the opening portion 33 formed at an area between the pixel 4b (pixel 4R) and the pixel 4r (pixel 4L). The behavior of light that passes through any other opening portion 33 is the same as that illustrated in this drawing. It should be further noted that the thickness of the glass substrate 21 in this drawing is displayed in such a manner that it is not in proportion to other components for the purpose of making the explanation of each optical path easier. In order to simplify illustration, the components of the element substrate 10 are omitted from the drawing.

Display light coming from the pixel 4r passes through the opening portion 33 and is refracted to change its direction when entering the air layer. Consequently, the display light is observed in a range of visualization angle 9r. In the same manner as described above, display light coming from the pixel 4g is observed within a range of visualization angle 9g, whereas display light coming from the pixel 4b is observed within a range of visualization angle 9b. Note that the visualization angle range 9r and the visualization angle range 9b partially overlap each other. In addition, the visualization angle range 9r partially overlaps with the visualization angle range 9g. The same applies for the visualization angle range 9b and the visualization angle range 9g.

Consequently, because the barrier layer 32 blocks the display light coming from the pixel 4b within an angular range VL, in an area which extends from the center to the left, the display light coming from the pixel 4r may only be observed in the angular range VL. On the other hand, because the barrier layer 32 blocks the display light coming from the pixel 4r within an angular range VR, which extends from an area in the center to the right, the display light coming from the pixel 4b is only observed in the angular range VR. In other words, the first image based on the pixel 4L only is observed in the angular range VL, whereas the second image based on the pixel 4R only is observed in the angular range VR. As described above, the liquid crystal device 1 is capable of displaying two different images, one within the angular range VL and the other within the angular range VR. It is possible to adjust both of the angular ranges VL and VR by modifying the width of the opening portion 33, the thickness of the glass substrate 21, and/or any other contributing factors. For example, each of the angular ranges VL and VR may be set between fifteen degrees and fifty degrees (15-50°), when measured from the direction of the normal of the glass substrate 21. In particular, it is preferable to set the angular range VL/VR at thirty degrees (30°) when measured from the direction of the normal of the glass substrate 21. This makes it is possible to observe the first image or the second image at high quality.

Note that both of the display light coming from the pixel 4b and the display light coming from the pixel 4r are observed in the center angular range VC, in an area which lies between the left angular range VL and the right angular range VR. That is, the center angular range VC constitutes a mixed image area where both of the first image and the second image are observed. This is because the width in the X direction of the opening portion 33 is greater than that of the light-shielding layer 14.

As described above, the liquid crystal device 1 is a so-called "dual-screen" display device that is able to display two different images in directions different from each other concurrently, which are concurrently observed from both the left side and the right side. For this reason, it is preferable that the liquid crystal device 1 offers a wide viewing angle. In particular, it is preferable that the liquid crystal device 1 has a high contrast when monitored from a direction that is slanted by approximately thirty degrees (30°).

Optical Characteristics

Figure 7:
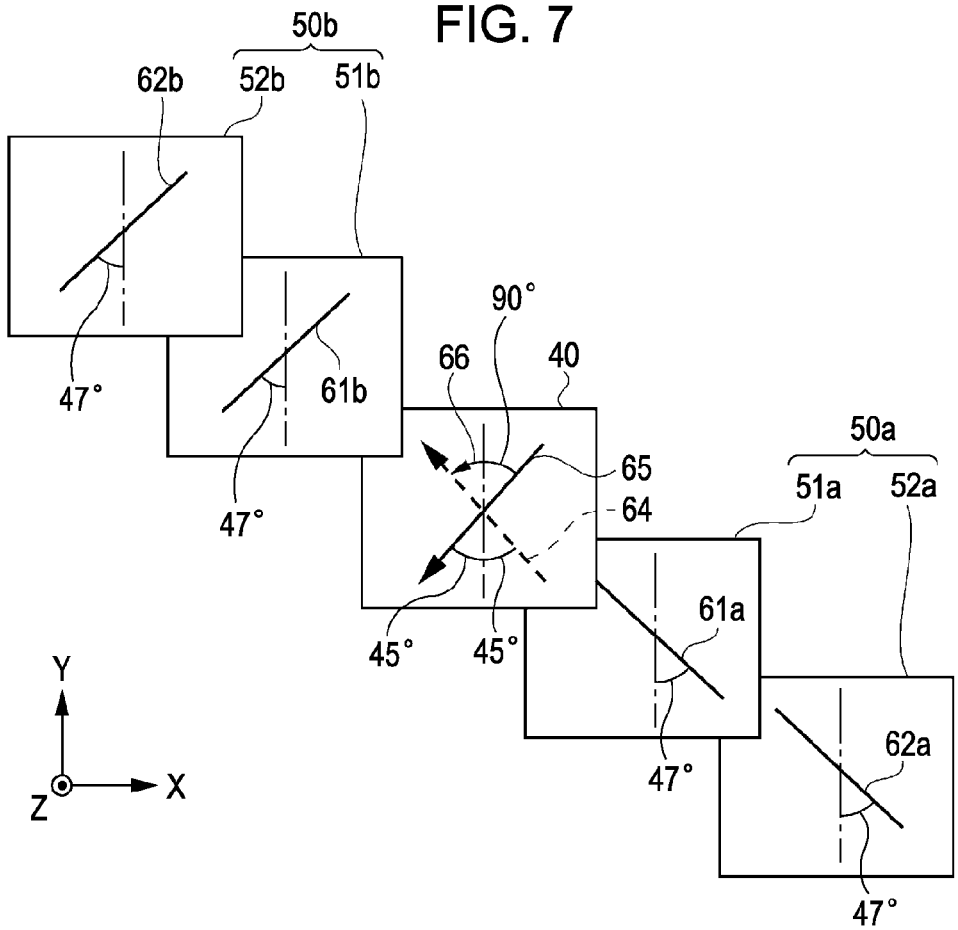
FIG. 7 is a schematic diagram illustrating the optical conditions in the liquid crystal device.

In order to satisfy the above-identified requirements, the liquid crystal device 1 has distinctive optical characteristics. FIG. 7 is a schematic diagram that illustrates an example of the optical characteristics of the liquid crystal device 1. The X-axis direction in this drawing corresponds to the horizontal direction of observation, whereas the Y-axis direction in this drawing corresponds to the vertical direction. In the following description, the Y direction is taken as a referential axis for indicating angles. The counterclockwise angular direction is designated as the positive direction, while the clockwise angular direction is denoted as the negative direction.

The orientation direction 64 of the liquid crystal layer 40 on the surface of the glass substrate 11 is at an angle of positive 45 degrees (+45°) from the Y-axis, while the orientation direction 65 of the liquid crystal layer 40 on the surface of the glass substrate 21 forms an angle of negative 45 degrees (−45°) from the Y-axis. Therefore, the twist angle 66 of the liquid crystal layer 40 is 90 degrees (90°). More specifically, it is 90 degrees (90°) in a counterclockwise direction from the glass substrate 21 (upper substrate) to the glass substrate 11 (lower substrate). Therefore, the positive "Y-axis" direction constitutes a clear viewing direction, and the orientation directions 64 and 65 agree with the direction of rubbing processing of the alignment and orientation film.

The retardation (Δnd) of the liquid crystal layer 40 is set at 0.35 μm. Herein, the value/symbol Δn denotes the refractive index anisotropy of liquid crystal molecules contained in the liquid crystal layer 40. The symbol "d" denotes the thickness of the liquid crystal layer 40. The above retardation value is smaller than the optimum level that is obtained when the liquid crystal device 1 is observed from the front. Using this configuration, it is possible to obtain an optimum retardation when the liquid crystal device 1 is observed at an oblique angle because the oblique optical path of light that passes through the liquid crystal layer 40 is relatively long, which increases the apparent retardation to the light.

The orientation axis 61a of the viewing angle compensation film 51a has the same angle as the absorption axis 62a of the polarizing plate 52a. That is, each of them forms an angle of positive 47 degrees (+47°) from the Y-axis. This means that each of the orientation axis 61a of the viewing angle compensation film 51a and the absorption axis 62a of the polarizing plate 52a are shifted from the orientation direction 64 of the liquid crystal layer 40 on the surface of the glass substrate 11 (+45°) by two degrees (2°) in a direction that is opposite to the twist direction of the liquid crystal layer 40. In other words, each of the orientation axis 61a and the absorption axis 62a is shifted by an angle of two degrees (2°) from the orientation direction 64 of the liquid crystal layer 40 on the surface of the glass substrate 11. In the following description, the orientation axis 61a and the absorption axis 62a may be correctively referred to as lower optical axes.

On the other hand, the orientation axis 61b of the viewing angle compensation film 51b has the same angle as that of the absorption axis 62b of the polarizing plate 52b. That is, each of them forms an angle of negative 47 degrees (−47°) with the Y-axis. Thus, the orientation axis 61b of the viewing angle compensation film 51b and the absorption axis 62b of the polarizing plate 52b is shifted from the orientation direction 65 of the liquid crystal layer 40 on the surface of the glass substrate 21 (−45°) by two degrees (2°) in the direction that is opposite to the twist direction of the liquid crystal layer 40. In other words, the orientation axis 61b and the absorption axis 62b are shifted by an angle of two degrees (2°) from the orientation direction 65 of the liquid crystal layer 40 on the surface of the glass substrate 21. In the following description, the orientation axis 61b and the absorption axis 62b may be correctively referred to as upper optical axes.

The above description can be paraphrased as follows: the angle formed between the lower optical axes and the upper optical axes is ninety-four degrees (94°). Thus, it is wider by two degrees (2°) on both the left and the right side than the twist angle 66 of the liquid crystal layer 40. If such a configuration, the absorption axis 62a of the polarizing plate 52a and the absorption axis 62b of the polarizing plate 52b are not orthogonal to each other when viewed from the front, or the direction normal to the glass substrate 21, but are orthogonal to each other when viewed from an oblique direction. As a result thereof, the maximum contrast may be obtained when viewed from an oblique direction. Specifically, the maximum contrast is obtained when viewed from a direction orthogonal to the clear viewing direction, which is determined by the twist direction of the liquid crystal layer 40. The clear viewing direction according to the present embodiment of the invention is the positive "Y" direction. Therefore, the maximum contrast is obtained when viewed from the positive "X" direction and the negative "X" direction which are orthogonal to the positive "Y" direction. In other words, the maximum contrast is obtained when viewed from horizontally inclined directions. In addition, since the retardation of the liquid crystal layer 40 is set at a small value, that is, 0.35 µm, the apparent retardation obtained when viewed at a horizontally inclined direction increases, providing an optimum retardation for a high contrast. For these reasons, the liquid crystal device 1 is capable of offering high-contrast display when viewed from a horizontally inclined direction.

Figure 8:
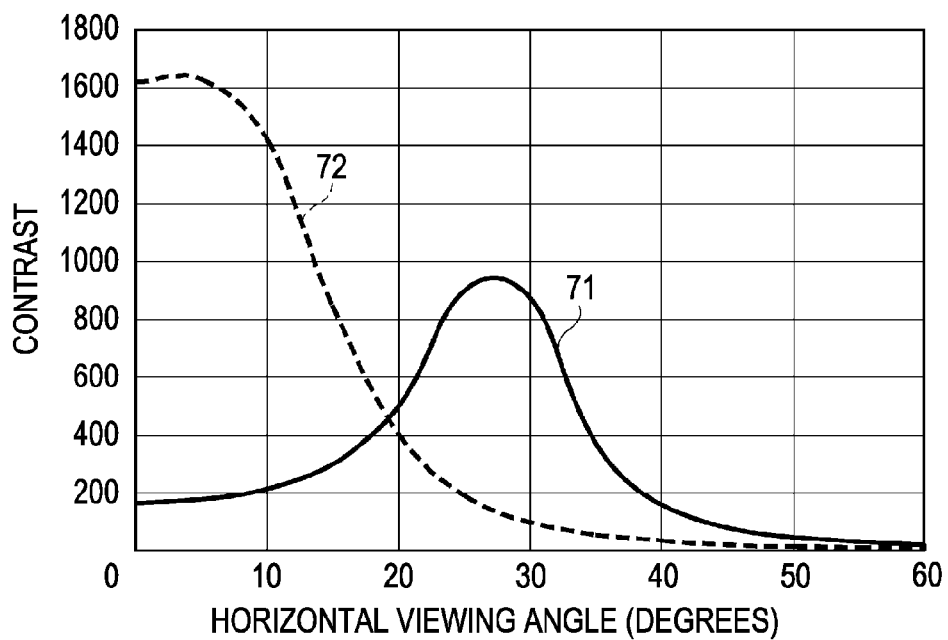
FIG. 8 is a graph representing the viewing angles in the liquid crystal device according to the exemplary embodiment of the invention compared to a conventional liquid crystal device.
Figure 9A:
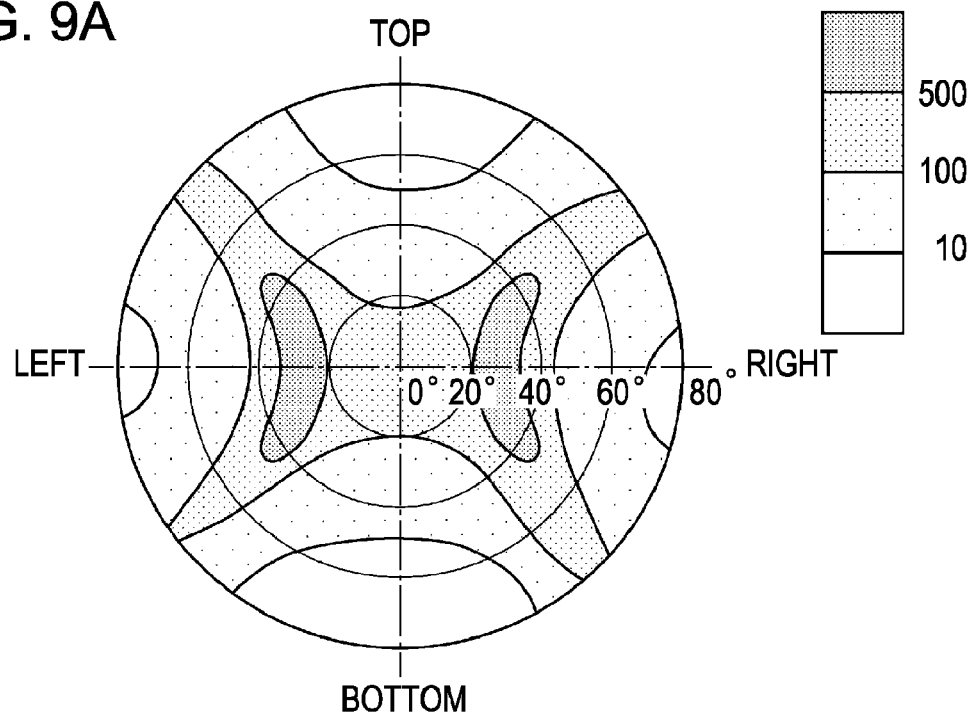
FIG. 9 is a set of diagrams illustrating the viewing angles of the liquid crystal device of the invention compared with that of the conventional liquid crystal device.
Figure 9B:
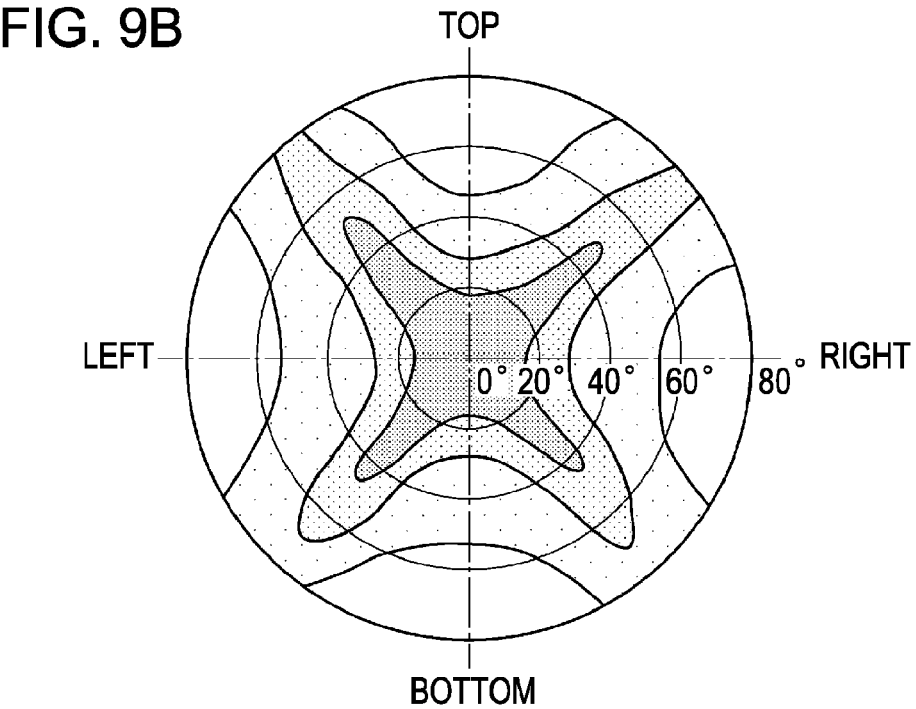

FIG. 8, FIGS. 9A and 9B illustrate the contrast viewing angle characteristic of the liquid crystal device 1 in comparison with that of conventional liquid crystal devices. Specifically, FIG. 8 is a graph that represents the visual characteristics of display contrast for the horizontal (left and right) viewing angles. FIG. 9 is a set of contour contrast curves obtained when the viewing angle is modified horizontally and vertically. The curve 71 illustrated in FIG. 8 represents the viewing angle characteristics of the liquid crystal device 1 according to the present embodiment of the invention. The curve 72 illustrated therein represents the viewing angle characteristic of conventional liquid crystal devices. Herein, in contrast to the configuration of the present embodiment of the invention, according to the illustrated conventional configuration, the retardation of the liquid crystal layer is 0.40 µm. In addition, according to the illustrated conventional configuration, both of the absorption axis of the polarizing plate and the orientation axis of the viewing angle compensation film agree, meaning that they are not shifted from the orientation direction of the liquid crystal layer on the surface of the substrate. As understood from these drawings, the liquid crystal device 1 features an enhanced contrast in the viewing angle range of approximately thirty degrees (30°) where the first image and the second image can be observed obliquely from the left and the right. In particular, at the horizontal thirty-degree (30°) viewing angle, the liquid crystal device 1 offers a high contrast of approximately 900, which is well over the contrast of conventional liquid crystal devices, that is, approximately 100. As described above, the liquid crystal device 1 is capable of performing a high-contrast display at the viewing angle that is most suitable for viewing both the first image and the second image. Thus, the invention ensures high visibility of images.

In the manufacturing of the liquid crystal device 1, the retardation of the liquid crystal layer 40 can be made smaller by decreasing the thickness of the liquid crystal layer 40 and by modifying the angles of the viewing angle compensation films 51a and 51b as well as those of the polarizing plates 52a and 52b. The thickness of the liquid crystal layer 40 can be reduced if, for example, the height of columnar spacers is lowered. Such a modification makes it easier to determine the height of the spacers. Therefore, the liquid crystal device 1 can be manufactured more easily than conventional liquid crystal devices. In addition, because the modification of the angles of the viewing angle compensation films 51a and 51b and those of the polarizing plates 52a and 52b according to the invention is only two degrees (2°), it does not significantly affect the number of components that can be produced from a given material. Thus, it is possible to manufacture the liquid crystal device 1 without requiring an increase in cost.

Second Embodiment

Next, a liquid crystal device 1A according to a second exemplary embodiment of the invention will be described. The liquid crystal device 1A according to the present embodiment of the invention has the same configuration as that of the liquid crystal device 1 according to the first embodiment of the invention described above except that the retardation of the liquid crystal layer 40 is changed from 0.35 µm to 0.32 µm. Accordingly, the same enlarged plane view of FIG. 1 and schematic sectional view of FIG. 2 apply for the liquid crystal device 1A.

Optical Condition

Figure 10:
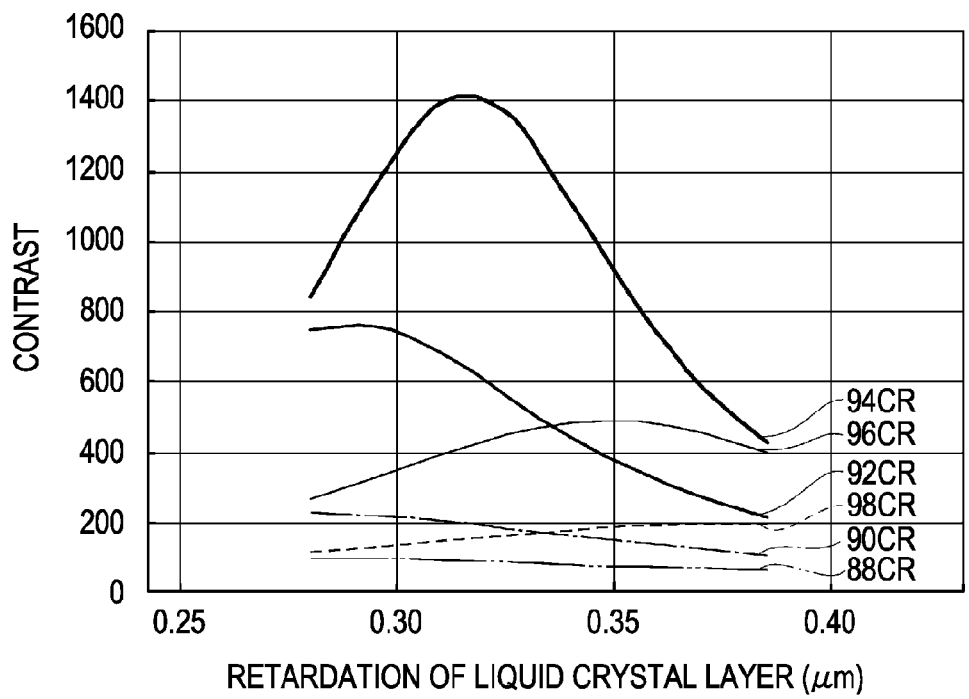
FIG. 10 is a graph that shows a relationship between the retardation of the liquid crystal layer 40 of the liquid crystal device and the resulting contrast.
Figure 12A:
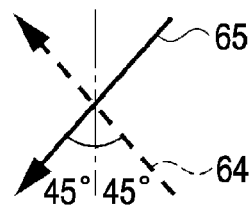
FIG. 12 is a set of diagrams that illustrate the optical conditions illustrated in FIGS. 10 and 11.
Figure 12B:
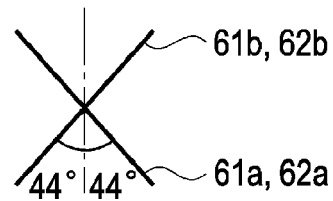
Figure 12C:
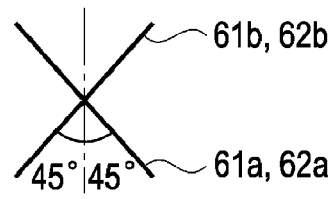
Figure 12D:
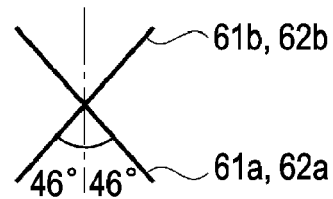
Figure 12E:
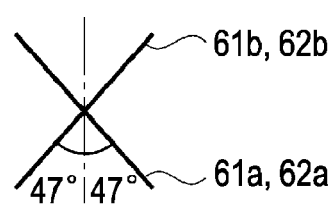
Figure 12F:
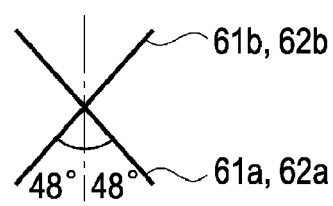
Figure 12G:
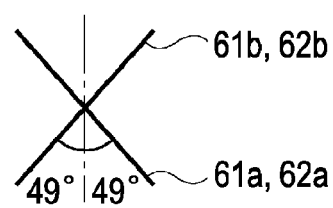

In order to explain the visual characteristics of the liquid crystal device 1A according to the present embodiment of the invention, an explanation is given below to the modified optical conditions of the liquid crystal device 1 from the first embodiment of the invention. More specifically, the viewing angle characteristics of the liquid crystal device 1 are changed from the first embodiment of the invention. FIG. 10 shows a relationship between the retardation of the liquid crystal layer 40 of the liquid crystal device 1 according to the first embodiment of the invention and the contrast offered thereby when viewed obliquely with a horizontal inclination of thirty degrees (30°), which change as the angles of the lower optical axes (i.e., orientation axis 61a and absorption axis 62a) and the upper optical axes (i.e., orientation axis 61b and absorption axis 62b) are changed. Six curves shown in FIG. 10 indicating examples of a variety of visual characteristics which correspond to a plurality of patterns of angles formed by the lower optical axes and the upper optical axes. Specifically, curves 88CR, 90CR, 92CR, 94CR, 96CR, and 98CR represent visual characteristics obtained when the angles formed by the lower optical axes and the upper optical axes are 88°, 90°, 92°, 94°, 96°, and 98°, respectively. FIG. 12 is a set of diagrams that illustrates these optical conditions. FIG. 12A shows the orientation directions 64 and 65 of the liquid crystal layer 40 that are twisted by ninety degrees (90°) from each other. FIG. 12B illustrates the lower optical axes and the upper optical axes when the angle formed thereby is eighty-eight degrees (88°). FIGS. 12C, 12D, 12E, 12F, and 12G illustrate the lower optical axes and the upper optical axes when the angles formed thereby are 90°, 92°, 94°, 96°, and 98°, respectively. In each of the above optical patterns, the lower optical axes and the upper optical axes are symmetric with respect to the Y direction. As understood from these drawings, the viewing angle characteristics change significantly when the optical conditions are changed in the configuration of the liquid crystal device 1 using the methods described in the first embodiment of the invention.

In the configuration of the liquid crystal device 1A according to the present embodiment of the invention, the angle formed by the lower optical axes and the upper optical axes is set at ninety-four degrees (94°), which is the same as that of the liquid crystal device 1 of the first embodiment of the invention. Accordingly, the visual characteristic of the liquid crystal device 1A according to the present embodiment of the invention is represented by the curve 94CR in FIG. 10. As has already been described above, the retardation of the liquid crystal layer 40 of the liquid crystal device 1A according to the present embodiment of the invention is set at 0.32 μm. Therefore, as shown in the graph, contrast obtained at the horizontal thirty-degree (30°) viewing angle is approximately 1400. Thus, the liquid crystal device 1A according to the present embodiment of the invention makes it possible to increase contrast, especially, at the optimum angle of view for the first and second images.

Variation

In actual implementation of the invention, optical condition is not limited to the specific example described above. That is, it may be arbitrarily modified within the technical scope of the invention. For example, the absorption axis 62a of the polarizing plate 52a may be shifted from the orientation direction 64 of the liquid crystal layer 40 on the surface of the glass substrate 11 by an angular amount of not less than one degree and not more than three degrees (i.e., a shift range of 1-3° inclusive) in a direction that is opposite to the twist direction of the liquid crystal layer 40. In the same way, the absorption axis 62b of the polarizing plate 52b may be shifted from the orientation direction 65 of the liquid crystal layer 40 on the surface of the glass substrate 21 by an angular amount of not less than one degree and not more than three degrees (i.e., a shift range of 1-3° inclusive) to the direction that is opposite to the twist direction of the liquid crystal layer 40. In FIG. 10, the curves 92CR, 94CR, and 96CR fall within the above shift range. In these optical conditions, it is preferable to set the retardation of the liquid crystal layer 40 at 0.37 μm or less. As understood from the graph of FIG. 10, such a combination of optical conditions makes it possible to obtain contrast of 300 or greater when the liquid crystal device is observed/monitored from the left and right with a viewing-angle of thirty degrees (30°).

Figure 11:
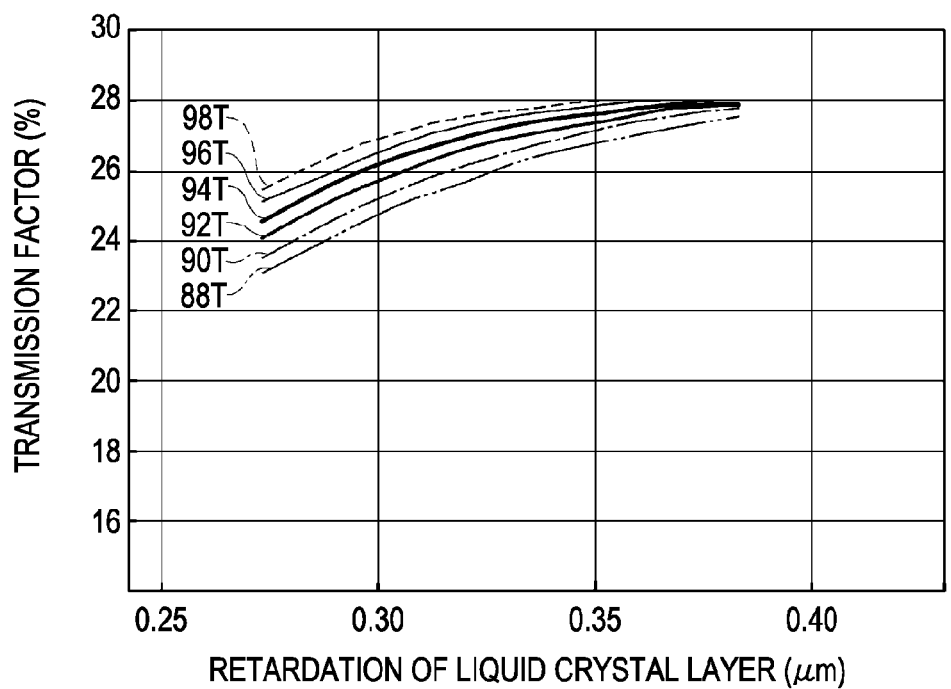
FIG. 11 is a graph showing the relationship between the retardation of the liquid crystal layer 40 of the liquid crystal device and the transmission factor.

FIG. 11 illustrates a relationship between the retardation of the liquid crystal layer 40 and the transmission factor in the configuration of the liquid crystal device 1 according to the first embodiment of the invention, which change as the angles of the lower optical axes and upper optical axes are changed. Six curves shown in FIG. 11 indicate examples of a variety of visual characteristics corresponding to a plurality of patterns of angles formed by the lower optical axes and the upper optical axes, which is similar to FIG. 10. Specifically, curves 88T, 90T, 92T, 94T, 96T, and 98T represent visual characteristics obtained when the angles formed by the lower optical axes and the upper optical axes are 88°, 90°, 92°, 94°, 96°, and 98°, respectively. The arrangements of the lower optical axes and the upper optical axes in these 88°, 90°, 92°, 94°, 96°, and 98° angular conditions are illustrated in FIGS. 12B, 12C, 12D, 12E, 12F, and 12G, respectively.

As understood from FIG. 11, in any of these angular curves (that is, angular optical conditions), the transmission factor increases as the retardation of the liquid crystal layer 40 increases. As the transmission factor is raised, the visibility of the first image and the second image is enhanced. As understood from these curves, the incremental change of the transmission factor is relatively small when the retardation of the liquid crystal layer 40 is set at 0.30 μm or greater. In contrast, the transmission factor decreases at a relatively large drop rate when the retardation of the liquid crystal layer 40 is less than 0.30 μm. For this reason, it is preferable to set the retardation of the liquid crystal layer 40 at 0.30 μm or greater in order to ensure a high transmission factor.

As described above, in the implementation of the invention, the angle formed by the lower optical axes and the upper optical axes may be selected within a range of 92-96°; while the retardation of the liquid crystal layer 40 may be selected within a range of 0.30-0.37 μm. Having such an optical configuration, the liquid crystal device according to the invention has enhanced contrast while maintaining brightness when viewed at the optimum angle for viewing for the first and second image. Thus, it is possible to improve visibility of these images.

Third Embodiment

Next, with reference to FIG. 13 and FIG. 14, a liquid crystal device 1B according to a third exemplary embodiment of the invention will be described. The arrangement positions of the pixels 4L, the pixels 4R, and the opening portions 33 of the liquid crystal device 1B are modified from those of the liquid crystal device 1 of the first embodiment of the invention. Except for the above difference, the configuration of the liquid crystal device 1B according to the present embodiment of the invention is the same as that of the liquid crystal device 1 according to the first embodiment of the invention. Therefore, in the following description, the liquid crystal device 1B according to the present embodiment of the invention will be explained while highlighting the above difference. It should be noted that the same reference numerals are consistently used in FIG. 13 and FIG. 14 for the same components as those of the liquid crystal device 1 illustrated in FIG. 1 and FIG. 3 so as to omit any redundant explanation.

Figure 13:
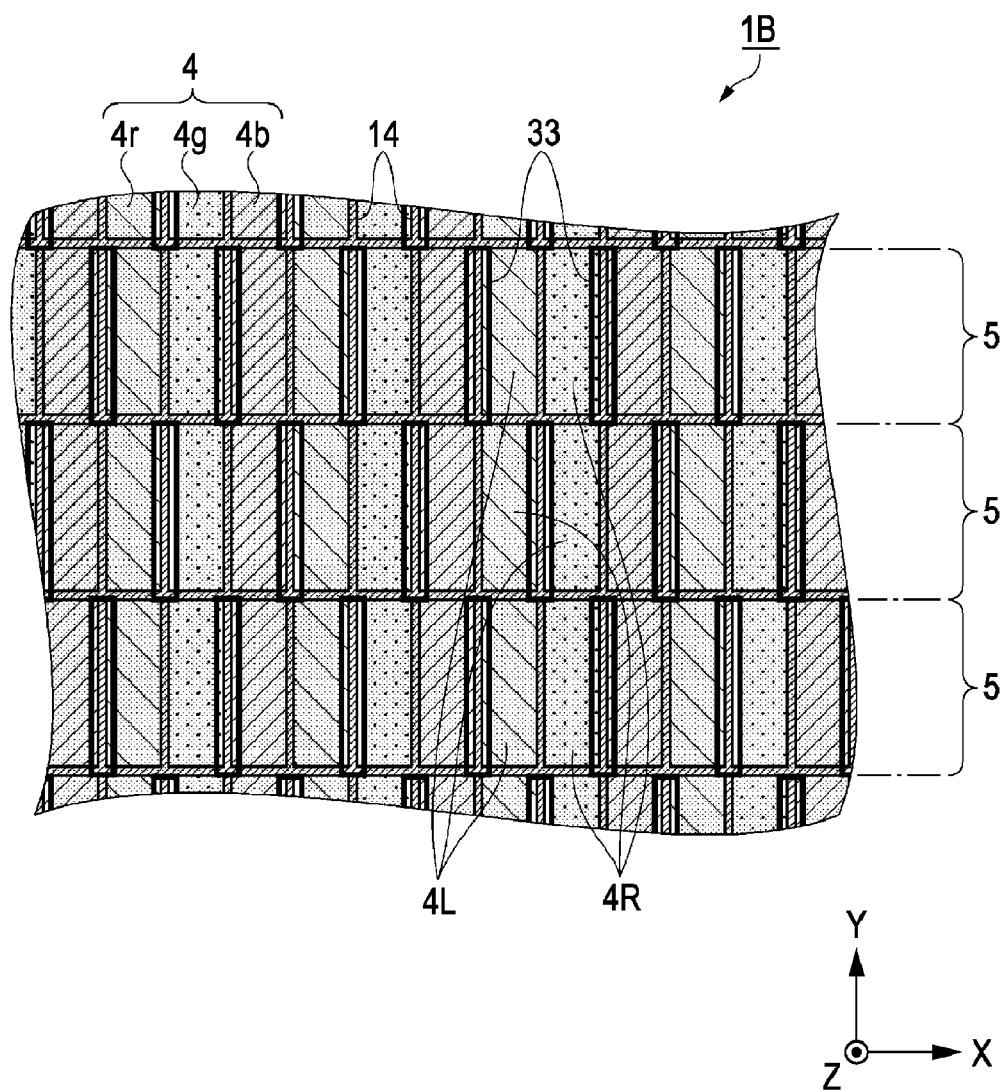
FIG. 13 is an enlarged plain view of a liquid crystal device according to a third exemplary embodiment of the invention.
Figure 14A:
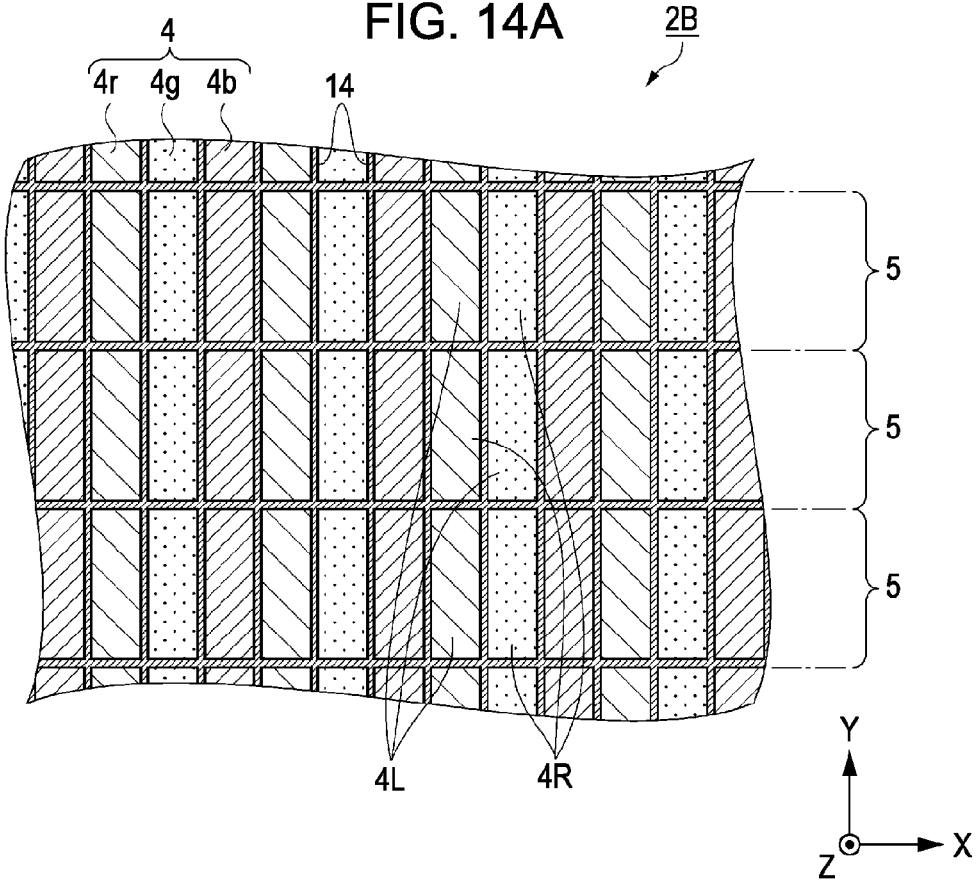
FIG. 14A is an enlarged plain view of a liquid crystal panel.
Figure 14B:
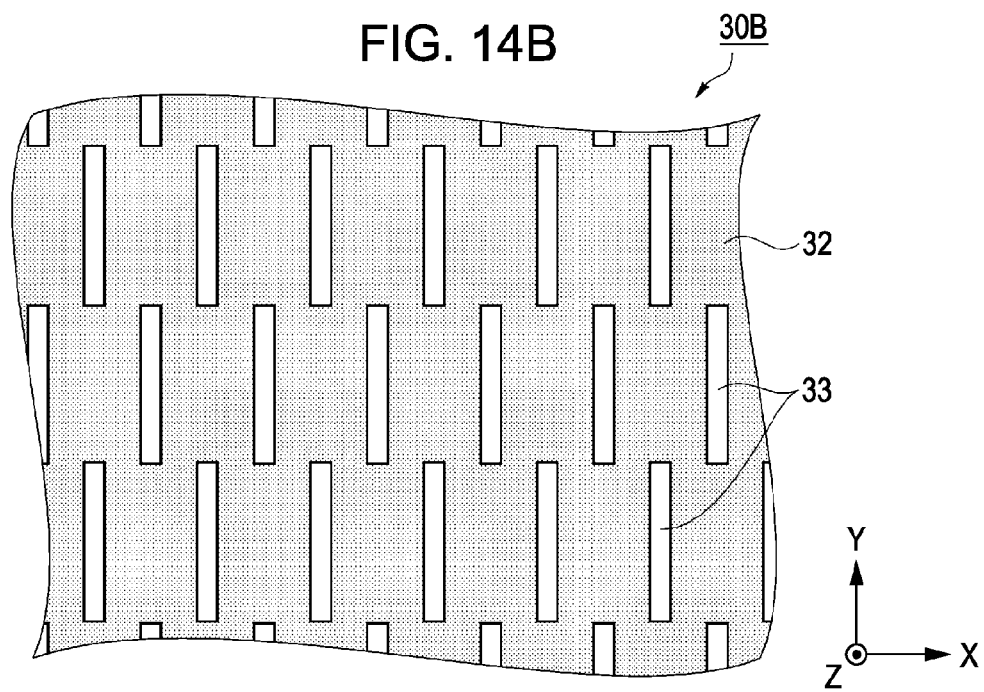
FIG. 14B is an enlarged plain view of a barrier mask substrate.

FIG. 13 is an enlarged plain view of a liquid crystal device 1B according to the third exemplary embodiment of the invention. The liquid crystal device 1B is also a so-called dual-screen display device that is able to concurrently display two different images, the first and second images, in different directions. The liquid crystal device 1B is provided with a liquid crystal panel 2B that functions as a display panel and is further provided with a barrier mask substrate 30B that is adhered to the liquid crystal panel 2B via an adhesive 35, which is the same configuration as that of the liquid crystal device 1. FIG. 14A is an enlarged plain view of the liquid crystal panel 2B before being adhered to the barrier mask substrate 30B. FIG. 14B is an enlarged plain view of the barrier mask substrate 30B before being adhered to the liquid crystal panel 2B. The shaded region with dots in FIG. 13 denotes an area that is covered by the barrier layer 32 formed in the barrier mask substrate 30B.

As illustrated in FIG. 14A, the liquid crystal panel 2B has rectangular pixels 4r, 4g, and 4b. The pixels 4r display red, while the pixels 4g display green, and the pixels 4b display blue. It should be noted that the pixels 4r, 4g, and 4b are arranged in a repetitive pattern when viewed along the X direction. Conversely, when viewed along the Y direction, the pixels 4 form a stripe pattern. That is, each of the groups of the pixels 4r, 4g, and 4b are arranged in such a manner that each color component forms vertical lines in the Y direction which form a vertical stripe pattern shown in the drawing. A light-shielding layer 14 is formed between each adjacent pair of pixels 4.

Each of the pixels 4 functions as either one of a pixel 4L that displays the first image and a pixel 4R that displays the second image. The pixels 4L and 4R are arranged in an alternating order when viewed along the X direction. In addition, in the present embodiment of the invention, the pixels 4L and 4R are arranged in an alternating order when viewed along the Y direction. That is, when viewed along the X direction of each pixel row 5, the pixel 4L, the light-shielding layer 14, the pixel 4R, and the light-shielding layer 14 are respectively arranged in order to form a unit of cyclic array. On the other hand, when viewed along the Y direction of the plurality of pixel rows 5, the above-mentioned unit of cyclic arrangement is shifted by a half pitch between each of vertically adjacent two pixel rows 5. In other words, when viewed along the direction orthogonal to the pixel row 5 (that is, when viewed along the Y direction), the pixels 4L and the pixels 4R are arrayed in an alternating order.

In accordance therewith, as illustrated in FIG. 14B, the positions of the opening portions 33 formed in the barrier layer 32 of the barrier mask substrate 30B are modified from those of the liquid crystal device 1 of the first embodiment of the invention. The barrier layer 32 formed in the barrier mask substrate 30B has the opening portions 33 at regions that substantially overlap the light-shielding layer 14 between the pixels 4L and the pixels 4R when viewed from the normal direction of the liquid crystal panel 2B. In this configuration, the phrase "between the pixels 4L and the pixels 4R" refers to regions between each pair of pixels 4L and pixels 4R, and not to the area between the pixels 4L and 4R in each pair of pixels. Therefore, the opening portions 33 are provided for every other line of the light-shielding layer 14 when viewed both in the X direction and in the Y direction. That is, in the present embodiment of the invention, the opening portions 33 are staggered (i.e., shifted) by a half pitch cyclic amount between each of vertically adjacent two pixel rows 5 so that the layout of the opening portions 33 corresponds to the array pattern of the pixels 4L and 4R. In other words, the slit-shaped opening portions 33 have a length that is substantially equal to the Y-axial width of the pixel row 5 and are arranged in an oblique direction. The barrier layer 32 having such an array pattern is called as a step barrier. The width of the opening portion 33 is configured to be slightly greater than that of the light-shielding layer 14.

According to the liquid crystal device 1B having the previously described step barrier configuration, the distance between two of the pixels 4L that are closest to each other among the pixels 4L that contribute to the same color-phase display equal a value obtained by multiplying that of a normal liquid crystal device which does not perform dual-screen display by $\sqrt{2}$. Therefore, the resolution of display according to the liquid crystal device 1B having the above-mentioned step barrier configuration equals a value that is calculated by multiplying that of the normal liquid crystal device by $1/\sqrt{2}$. The same feature applies for the pixels 4R. On the other hand, display resolution of the liquid crystal device 1 according to the first embodiment of the invention, which has a stripe array pattern of the pixels 4L and 4R, is a half (½) of that of a normal liquid crystal device. Therefore, the above-described configuration according to the present embodiment of the invention makes it possible to improve the resolution of display in comparison with that of the first embodiment of the invention by a multiplication factor of $\sqrt{2}$.

The sectional view of the liquid crystal device 1B as well as the relationship between viewing angles and the corresponding observed images thereof are the same as those of the liquid crystal device 1 according to the first embodiment of the invention, which are illustrated in FIG. 6. Therefore, the liquid crystal device 1B according to the present embodiment of the invention is also capable of displaying two different images, for example, the first image within the angular range VL and the second image within the angular range VR, as the liquid crystal device 1 according to the first embodiment of the invention.

The retardation of the liquid crystal layer 40 of the liquid crystal device 1B is set at 0.35 μm, which is the same as that of the liquid crystal device 1 according to the first embodiment of the invention. In addition, in the configuration of the liquid crystal device 1B according to the present embodiment of the invention, each of the orientation axis 61a of the viewing angle compensation film 51a and the absorption axis 62a of the polarizing plate 52a are shifted from the orientation direction 64 of the liquid crystal layer 40 on the surface of the glass substrate 11 (+45°) by the angular amount of two degrees (2°) in a direction that is opposite to the twist direction of the liquid crystal layer 40, whereas each of the orientation axis 61b of the viewing angle compensation film 51b and the absorption axis 62b of the polarizing plate 52b is shifted from the orientation direction 65 of the liquid crystal layer 40 on the surface of the glass substrate 21 (−45°) by the angular amount of two degrees (2°) in a direction that is opposite to the twist direction of the liquid crystal layer 40. Having such an optical configuration, the liquid crystal device 1B of the present embodiment of the invention is capable of performing a high-contrast display at the viewing angle that is most suitable for viewing the first image and the second image. Thus, the invention ensures high visibility of images.

APPLICATION EXAMPLE

Figure 15:
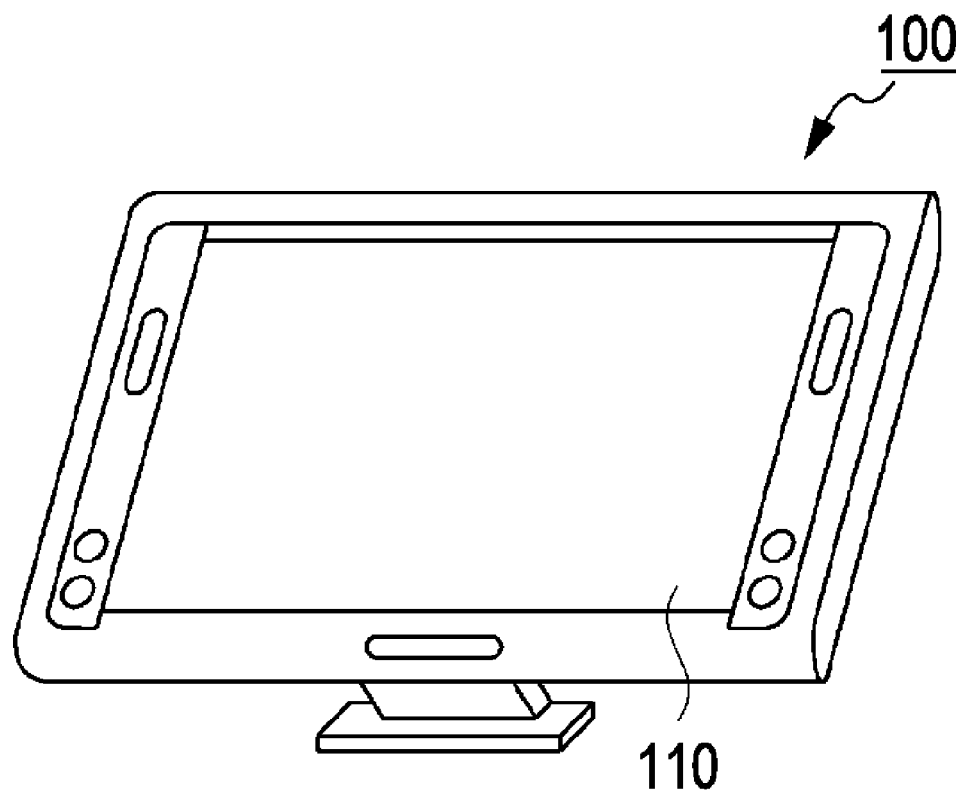
FIG. 15 is a perspective view of a display device for a car navigation system.

The liquid crystal device 1 described above can be used in a variety of electronic apparatuses, including the device 100 illustrated in FIG. 15, which makes up a car navigation system. Using the liquid crystal device 1 of the invention, which is built in the display section 110 of the device 100, the display device 100 is capable of simultaneously displaying two different images in different directions at the same time. For example, the display device 100 is capable of simultaneously displaying a map image toward a driver's seat while displaying movie pictures toward a front passenger's seat. In such an application, the invention makes it possible to offer high-quality display with a high contrast.

The liquid crystal device 1 according to the present invention can be implemented as a variety of electronic apparatuses, including but not limited to, a mobile computer, a digital camera, a digital video camera, automobile-installed equipment, audio equipment, in addition to the display device 100 described above.

Although various exemplary embodiments of the present invention are described above, the invention is in no way restricted to these exemplary embodiments described herein; and the invention may be configured in an adaptable manner in a variety of variations and/or modifications without departing from the spirit thereof. Some of conceivable variation examples are as follows.

Variation Example 1

The liquid crystal device 1 according to the exemplary embodiments of the invention described above simultaneously displays two images in different directions. Nevertheless, the invention may be modified in such a manner that the liquid crystal device concurrently displays three or more images. The liquid crystal device can be modified to display three or more images concurrently by providing pixels 4C that display a third image in addition to the pixels 4L that display the first image and the pixels 4R that display the second image, and by emitting the transmitted light toward directions different from one another by means of the barrier layer 32 of the barrier mask substrate 30. In such a configuration, it is possible to control the display directions thereof by adjusting the distance between the color filters 12 and the barrier layer 32.

Variation Example 2

According to the exemplary embodiments of the invention described above, the twist angle 66 of the liquid crystal layer 40 is set at ninety degrees (90°). In addition, the lower optical axes and the upper optical axes are shifted from the orientation direction 64 and 65 of the liquid crystal layer 40 by the angular amount of two degrees (2°), respectively. However, it is not necessary for these optical components to conform to exactly the same angles as specified in the specification. As long as the invention is implemented with an optical angular configuration that is substantially in accordance with the specified values described herein, it is possible to obtain advantageous effects of the invention even if there is any negligible angular difference between the optical components. For example, even in a case where there occurs any unintended angular differences of approximately ±1° in these specified angles due to variation in production thereof or any other similar reasons, the invention may still offer substantially the same advantageous effects as those described in this specification.

What is claimed is:

1. A liquid crystal device capable of simultaneously displaying at least two images in different directions, the liquid crystal device comprising:

a first substrate having a translucent property;

a second substrate having a translucent property which is disposed opposite to the first substrate;

a liquid crystal layer with an orientation direction, the liquid crystal layer being is disposed between the first substrate and the second substrate, the liquid crystal layer having a twist angle of approximately ninety degrees;

a first polarizing plate with a first absorption axis, the first polarizing plate being opposed to the liquid crystal layer with the first substrate being disposed between the first polarizing plate and the liquid crystal layer; and a second polarizing plate with a second absorption axis, the second polarizing plate being opposed to the liquid crystal layer with the second substrate being disposed between the second polarizing plate and the liquid crystal layer, wherein the absorption axis of the first polarizing plate is shifted from the orientation direction of the liquid crystal layer by an angular amount of not less than one degree and not more than three degrees, and wherein the second absorption axis of the second polarizing plate is shifted from an orientation direction of the liquid crystal layer by an angular amount of not less than one degree and not more than three degrees.

2. The liquid crystal device according to claim 1, wherein the retardation of the liquid crystal layer is between 0.30 μm and 0.37 μm.

3. The liquid crystal device according to claim 1, further comprising:

a first film interposed between the first substrate and the first polarizing plate, the first film having an orientation axis that is substantially aligned with the first absorption axis of the first polarizing plate, the first film containing discotic polymer liquid crystal with a hybrid orientation; and a second film interposed between the second substrate and the second polarizing plate, the second film having an orientation axis that is substantially aligned with the second absorption axis of the second polarizing plate, the second film containing discotic polymer liquid crystal with a hybrid orientation.

4. The liquid crystal device according to claim 3, wherein the retardation of the liquid crystal layer is approximately 0.32 μm, and the first absorption axis of the first polarizing plate and orientation axis of the first film are shifted from the orientation direction of the liquid crystal layer by an angle of approximately two degrees, and both of the second absorption axis of the second polarizing plate and the orientation axis of the second film are shifted from the orientation direction of the liquid crystal layer by an angle of approximately two degrees.

5. The liquid crystal device according to claim 3, wherein the retardation of the liquid crystal layer is approximately 0.35 μm, and the first absorption axis of the first polarizing plate and the orientation axis of the first film are shifted from the orientation direction of the liquid crystal layer by an angle of approximately two degrees, and both the second absorption axis of the second polarizing plate and the orientation axis of the second film are shifted from the orientation direction of the liquid crystal layer by an angle of approximately two degrees.

6. An electronic apparatus that has the liquid crystal device according to claim 1 in a display section.

7. A liquid crystal device capable of simultaneously displaying at least two images in different directions, the liquid crystal device comprising:

a first substrate having a translucent property;

a second substrate having a translucent property which is disposed opposite to the first substrate;

a liquid crystal layer with an orientation direction, the liquid crystal layer being is disposed between the first substrate and the second substrate, the liquid crystal layer having a twist angle of approximately ninety degrees;

a first polarizing plate with a first absorption axis, the first polarizing plate being opposed to the liquid crystal layer with the first substrate being disposed between the first polarizing plate and the liquid crystal layer;

a first film interposed between the first substrate and the first polarizing plate, the first film having an orientation axis that is substantially aligned with the first absorption axis of the first polarizing plate, the first film containing discotic polymer liquid crystal with a hybrid orientation; and a second film interposed between the second substrate and the second polarizing plate, the second film having an orientation axis that is substantially aligned with the second absorption axis of the second polarizing plate, the second film containing discotic polymer liquid crystal with a hybrid orientation; and a second polarizing plate with a second absorption axis, the second polarizing plate being opposed to the liquid crystal layer with the second substrate being disposed between the second polarizing plate and the liquid crystal layer, wherein the first absorption axis of the first polarizing plate and orientation axis of the first film are shifted from the orientation direction of the liquid crystal layer by an angle of approximately two degrees, and wherein the second absorption axis of the second polarizing plate and the orientation axis of the second film are shifted from the orientation direction of the liquid crystal layer by an angle of approximately two degrees.

8. The liquid crystal device according to claim 7, wherein the retardation of the liquid crystal layer is between 0.30 μm and 0.37 μm.

9. An electronic apparatus that has the liquid crystal device according to claim 7 in a display section.

* * * * *